United States Patent
Lee et al.

(10) Patent No.: US 7,724,770 B2
(45) Date of Patent: May 25, 2010

(54) METHOD AND APPARATUS FOR SWITCHING DATA IN COMMUNICATION SYSTEM

(75) Inventors: Chen-Yi Lee, Hsin-Chu (TW); Jr-Hau Lu, Taipei Hsien (TW); Chien-Ching Lin, Chia-Yi Hsien (TW); Hsie-Chia Chang, Keelung (TW); Yar-Sun Hsu, Taipei Hsien (TW)

(73) Assignee: National Chiao Tung University, Hsin-Chu (TW)

( * ) Notice: Subject to any disclaimer, the term of this patent is extended or adjusted under 35 U.S.C. 154(b) by 582 days.

(21) Appl. No.: 11/708,608

(22) Filed: Feb. 21, 2007

(65) Prior Publication Data

US 2008/0198938 A1   Aug. 21, 2008

(51) Int. Cl.
*H04J 3/16* (2006.01)
(52) U.S. Cl. .................. 370/466; 370/503; 375/354
(58) Field of Classification Search ......... 370/465–466, 370/503–516; 375/354; 714/716–747, 775–785
See application file for complete search history.

(56) References Cited

U.S. PATENT DOCUMENTS

2005/0180310 A1* 8/2005 Mueller et al. .............. 370/204

* cited by examiner

*Primary Examiner*—Ricky Ngo
*Assistant Examiner*—Pao Sinkantarakorn
(74) *Attorney, Agent, or Firm*—Birch, Stewart, Kolasch & Birch, LLP

(57) ABSTRACT

A method and apparatus for switching data in communication system which comprises of mainly a conversion circuit to receive the source data possessing in a real coding dimension and covert it to converted the data possessing in a tolerable coding dimension; the judgment bits are set in the converted data to designate the data as source data or not. Later on, shifter circuit is used to shift the converted data in certain amount and generates a shifted data; meanwhile, the right side and left side of shifted data are used to start acquiring the real coding dimension to be used respectively as a first data and a second data. Finally, a comparison and selection circuit is used to compare the corresponding judgment bits in the first and the second data and to output an output data, wherein output data is source data with the above-mentioned amount of shift.

19 Claims, 10 Drawing Sheets

METHOD AND APPARATUS FOR SWITCHING DATA IN COMMUNICATION SYSTEM

FIELD OF THE INVENTION

The present invention relates to a data switching device and method, it specifically relates to a method and apparatus for switching data in communication system.

BACKGROUND OF THE INVENTION

In a communication system, data switching device is needed to convert a source data transmitted from the previous circuit into an output data to be used by subsequent circuit for data processing. Data switching device is just like a translation system between previous circuit and the subsequent circuit, the previous circuit needs a data-switching device to convert source data into output data that can be controlled by the subsequent circuit before data processing can be performed by the subsequent circuit. Therefore, it is indispensable no matter in the transmitter or the receiver of communication system. Here, the output data is generated by shifting the source data. Note that, the communication specification it supports has to be decided and needs to match the above-mentioned previous circuit processing and data transmission. For example, IEEE 802.16e Worldwide Interoperability for Microwave Access (WiMax), IEEE802.11n, Digital Video Broadcasting (DVB), $4^{th}$ generation mobile communication (4G) and Ultra-Wideband (UWB), etc. Therefore, all the source data received by data switching device should match the coding dimension as specified by the communication specification.

In conventional data switching device, since data shifting is needed to achieve the purpose of converting the source data transmitted from the previous circuit into output data; therefore, shifter circuit is needed to perform the operation of shifting data. Conventional shifter circuit is designed with data shifting data component, that is, multiple numbers of multiplexers are used to move the source data. Each multiplexer is connected to the data of two neighboring bit in source data and the last multiplexer is connected to the highest bit and the lowest bit of the source data; then through the by controlling the multiplexer, and complete the shifting operation of source data. However, the number of multiplexer is related to the coding dimension and each communication specification has multiple sizes of coding dimensions; moreover, all the coding dimension are different, take the WiMax) as an example, it has 19 sizes of coding dimensions for the LDPC (Low Density Parity Check) encoder and decoder, thus, the above-mentioned coding dimensions of source data are all different. Therefore, in conventional data switching device, the shifter circuit design in dealing with fixed size of coding dimensions which the architecture includes one fixed size shifter circuit and perform only single coding dimension, that is, it is not allowed to use the same shifter circuit to shift source data according to multiple sizes of coding dimension.

Take WiMax as an example, if all the 19 sizes of coding dimensions specified by WiMax LDPC code are to be used in the communication production, data switching device should be implemented using a circuit comprising of 19 different sizes shifters to process corresponding data for 19 sizes of coding dimensions respectively. The electronic circuit will occupy pretty large chip area and the complexity of hardware design will be relatively increased too. Furthermore, the manufacturing cost is relatively increased too.

Therefore, it is highly expected that a multi-size coding dimensions data switching device for communication system that reduces circuit area and hardware complexity can be invented.

SUMMARY OF THE INVENTION

One purpose of the present invention is to provide a method and apparatus for switching data in communication system and can switch all sizes of the coding dimensions defined in of the communication specification.

Another purpose of the present invention is to provide a method and apparatus for switching data in communication system in order to simplify the circuit and reduce the hardware cost.

Yet another purpose of the present invention is to provide a method and apparatus for switching data in communication system that reduces the chip area and the complexity of hardware.

According to the above-mentioned purposes of the present invention, a method and apparatus for switching data in communication system is proposed, which uses a conversion circuit to receives a source data possessing in the real or expected coding dimension, then the source data is converted to a converted data possessing in a tolerable or maximum coding dimension; judgment bits are inserted in the converted data to designate the data as source data or not. Later on, only one shifter circuit is used to shift the converted data in certain shift amount so as to generate a shifted data; meanwhile, the right side and the left side of shifted data are used to acquire the real coding dimension to be used as the first data and the second data respectively. Finally, a comparison and selection circuit is used to compare the corresponding judgment bits in the first and the second data and select the final output data.

According to the above-mentioned purposes of the present invention, a method and apparatus for switching data in communication system is proposed. First, the source data possessing in the real or expected coding dimension is received; then the source data is converted into converted data possessing in a tolerable or maximum coding dimension, wherein the real coding dimension should not be larger than the tolerable coding dimension. Moreover, by setting or inserting the judgment bits, the source data is designated as the correct bit and the non-source data is designated as the error bit. The converted data are shifted according to a certain shift amount to generate a shifted data. The lower part and higher part of shifted data in the real coding dimension are used to be used as a first data and a second data respectively. Finally, the output data is selected by comparing the corresponding judgment bits in the first and the second data.

BRIEF DESCRIPTIONS OF THE DRAWINGS

Figure 4A:
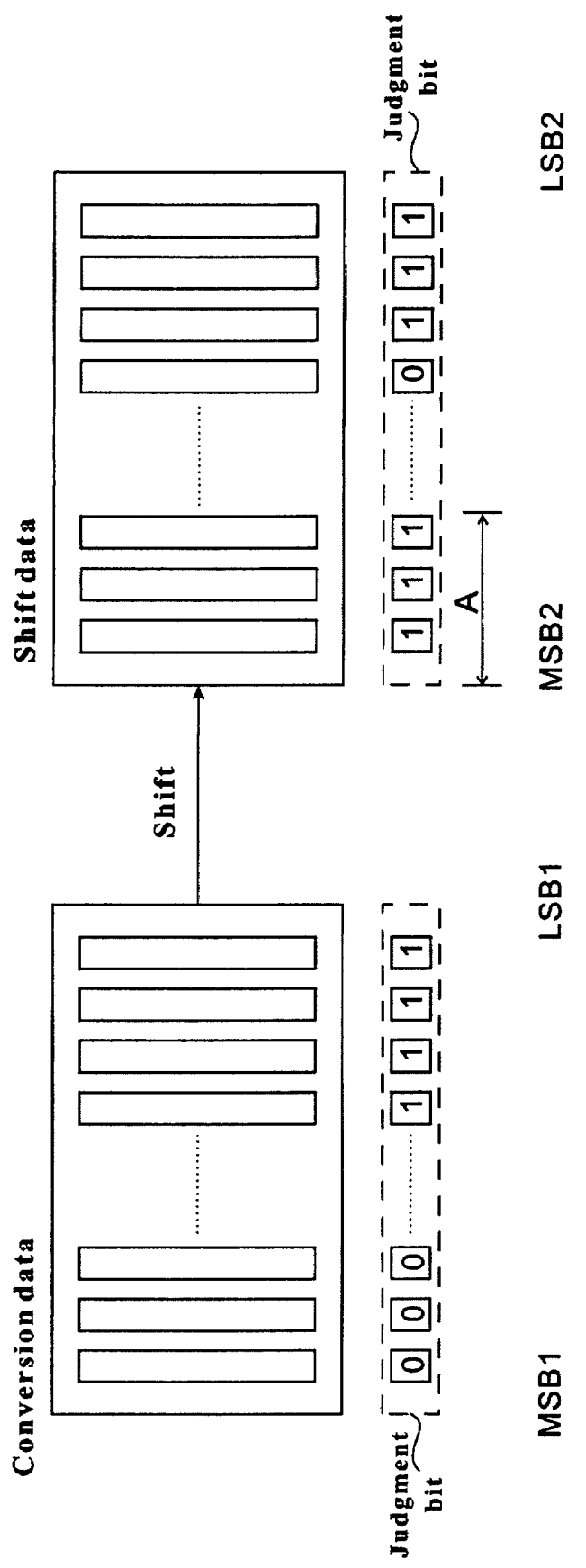
Figure 4B:
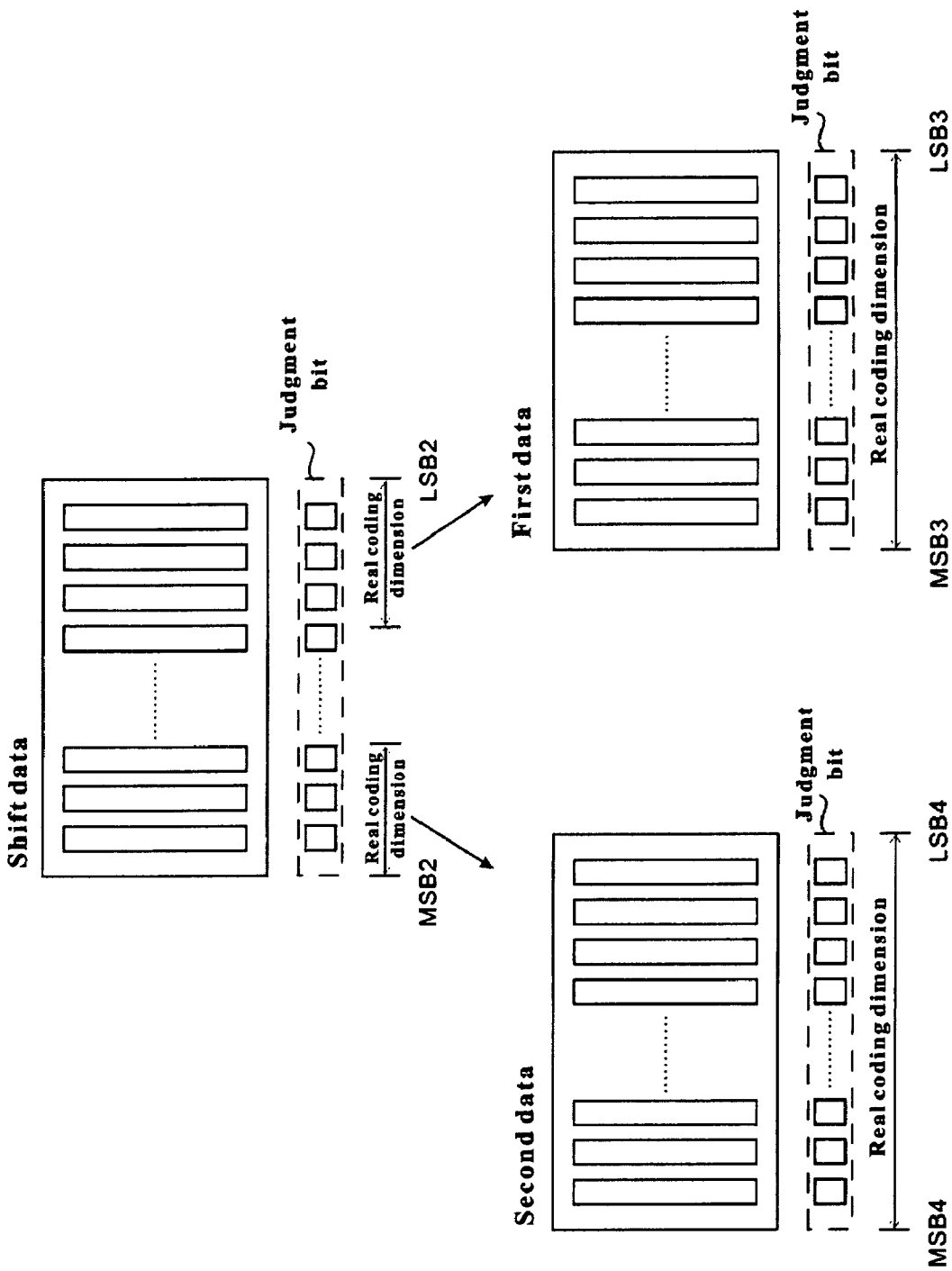
Figure 5:
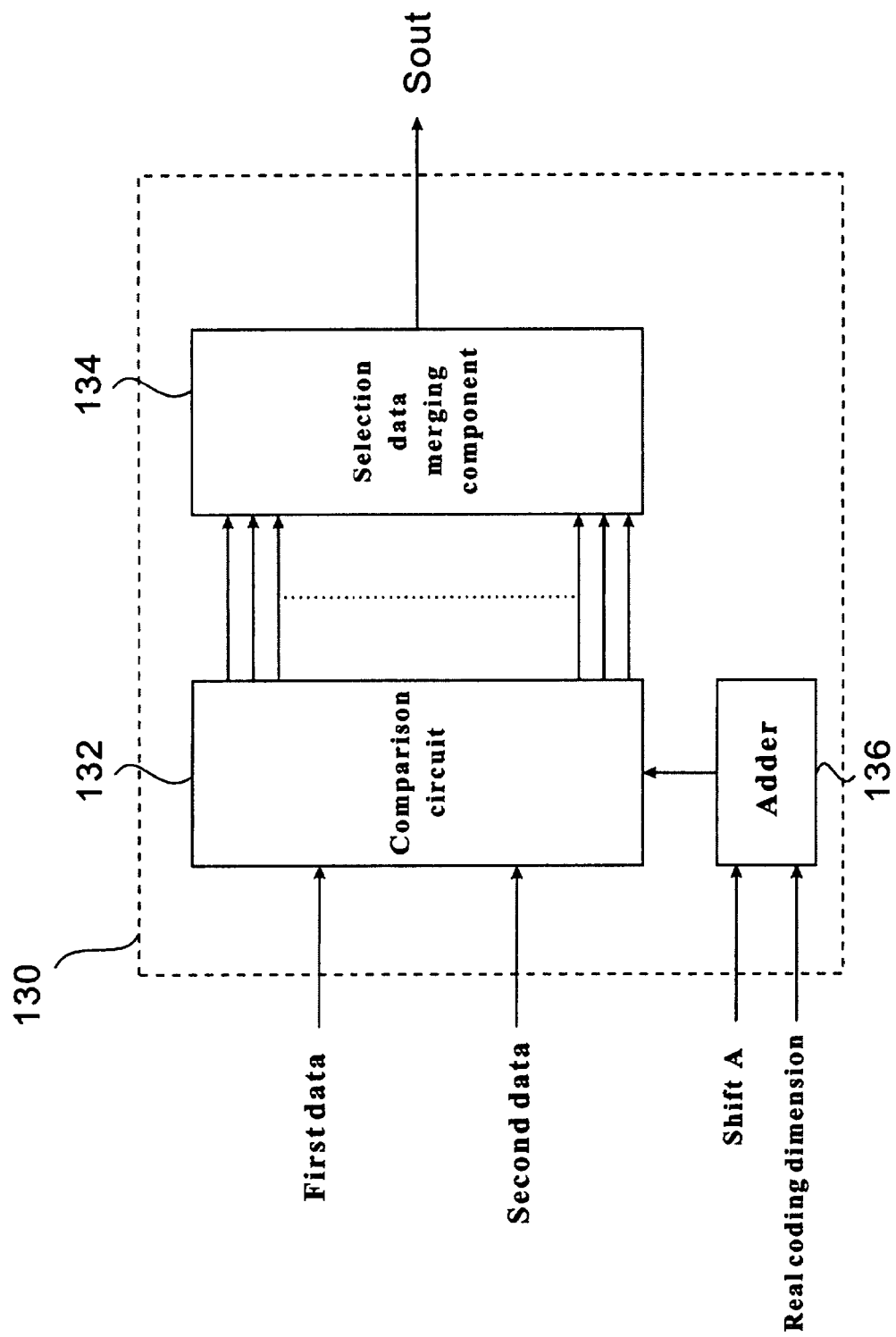
Figure 6:
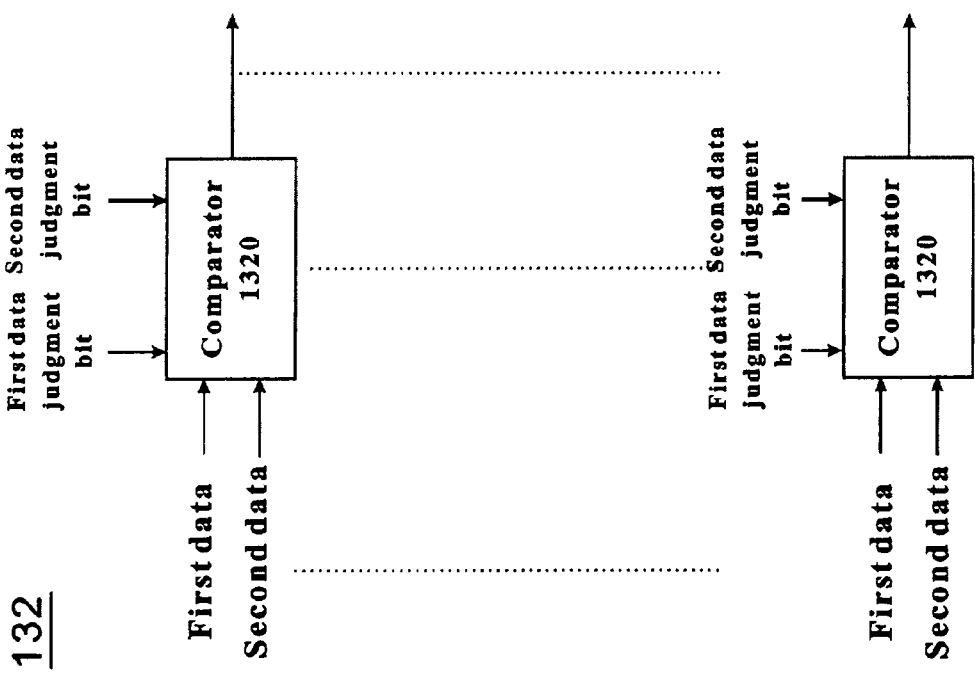
Figure 7:
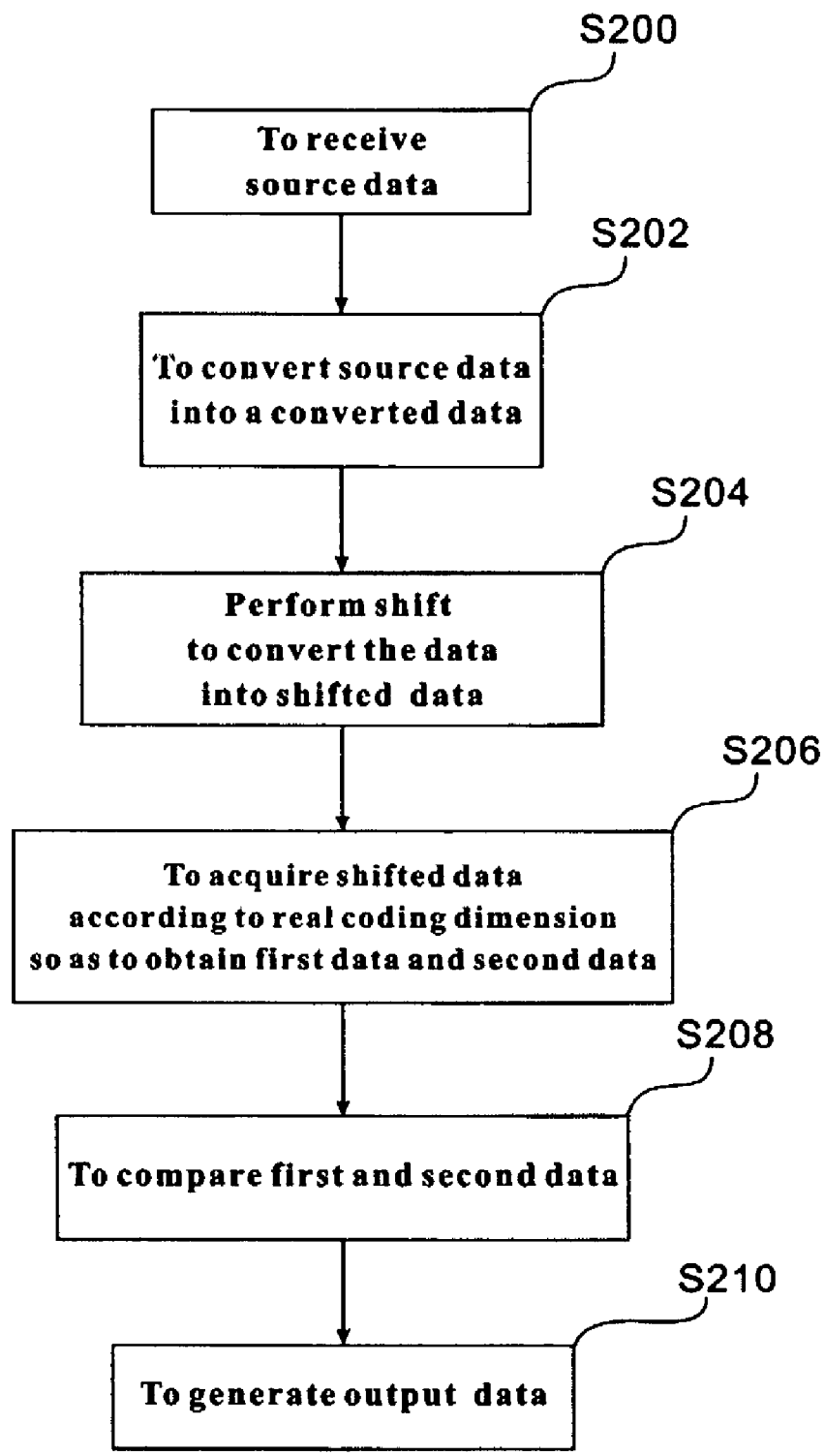

FIG. 4A~4B is the illustration of processing flows of shifter circuit of the present invention;

FIG. 5 is the basic architecture of comparison and selection circuit of the present invention;

FIG. 6 is the basic architecture of comparison circuit of the present invention;

FIG. 7 is the process flow of data switching of the present invention; and

Figure 8:
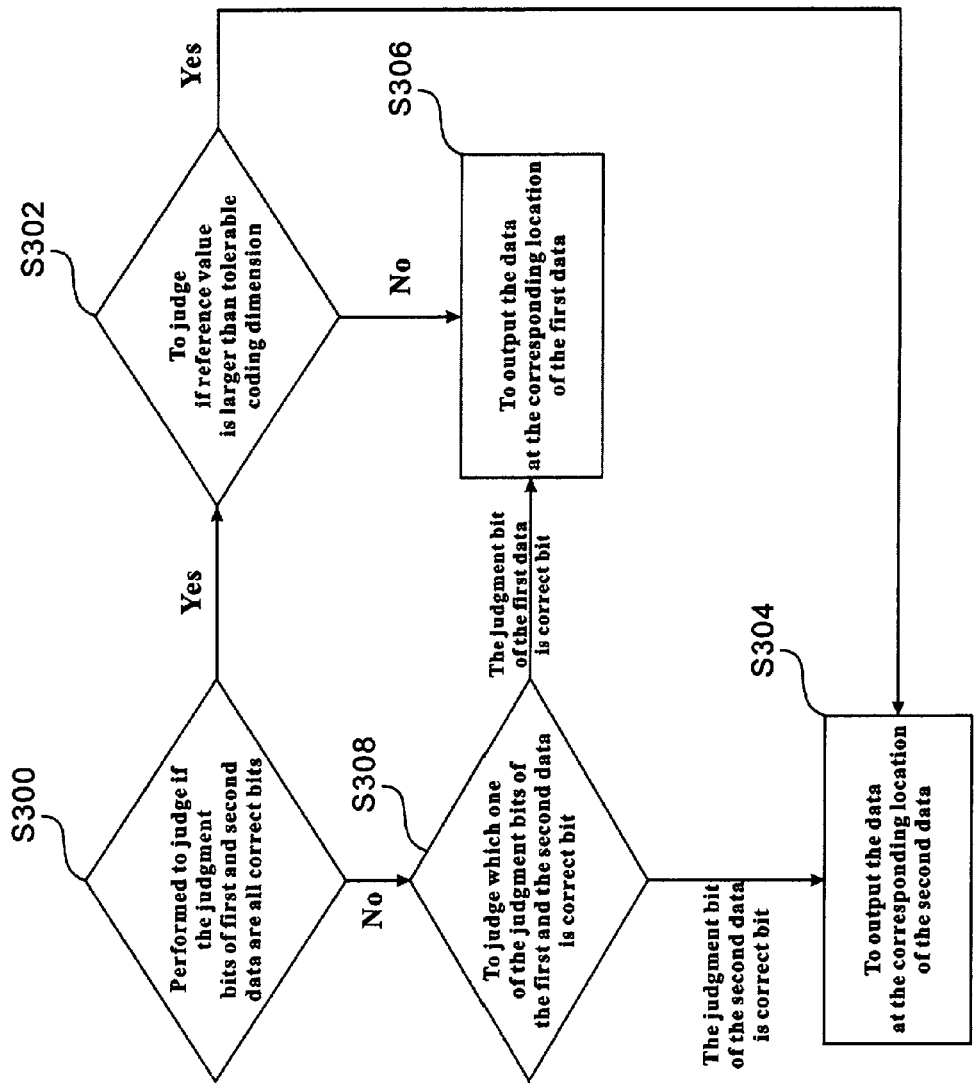

FIG. 8 is the process flows of a method of comparison of the judgment bits of the first and the second data of the present invention.

DETAILED DESCRIPTION OF THE PREFERRED EMBODIMENTS

A method and apparatus for switching data in communication system is provided in the present invention. What makes it different than conventional data switching device is, for the data switching device of the present invention, under the communication specification supported by the communication system, the source data can be shifted according to all sizes of coding dimensions by such a data switching device; therefore the limitation issues of corresponding treatment in conventional data shifter is that shifts the source data according to one fixed coding dimension only. Note that, data switching device of the present invention uses only one size shifter circuit; therefore, the space and chip area used to implement the electronic circuit design is correspondingly much smaller than the conventional data switching device or a multi-size shifter in the multi-sizes of coding dimension, and of course, the complexity of electronic circuit design is relatively lower.

Figure 1:
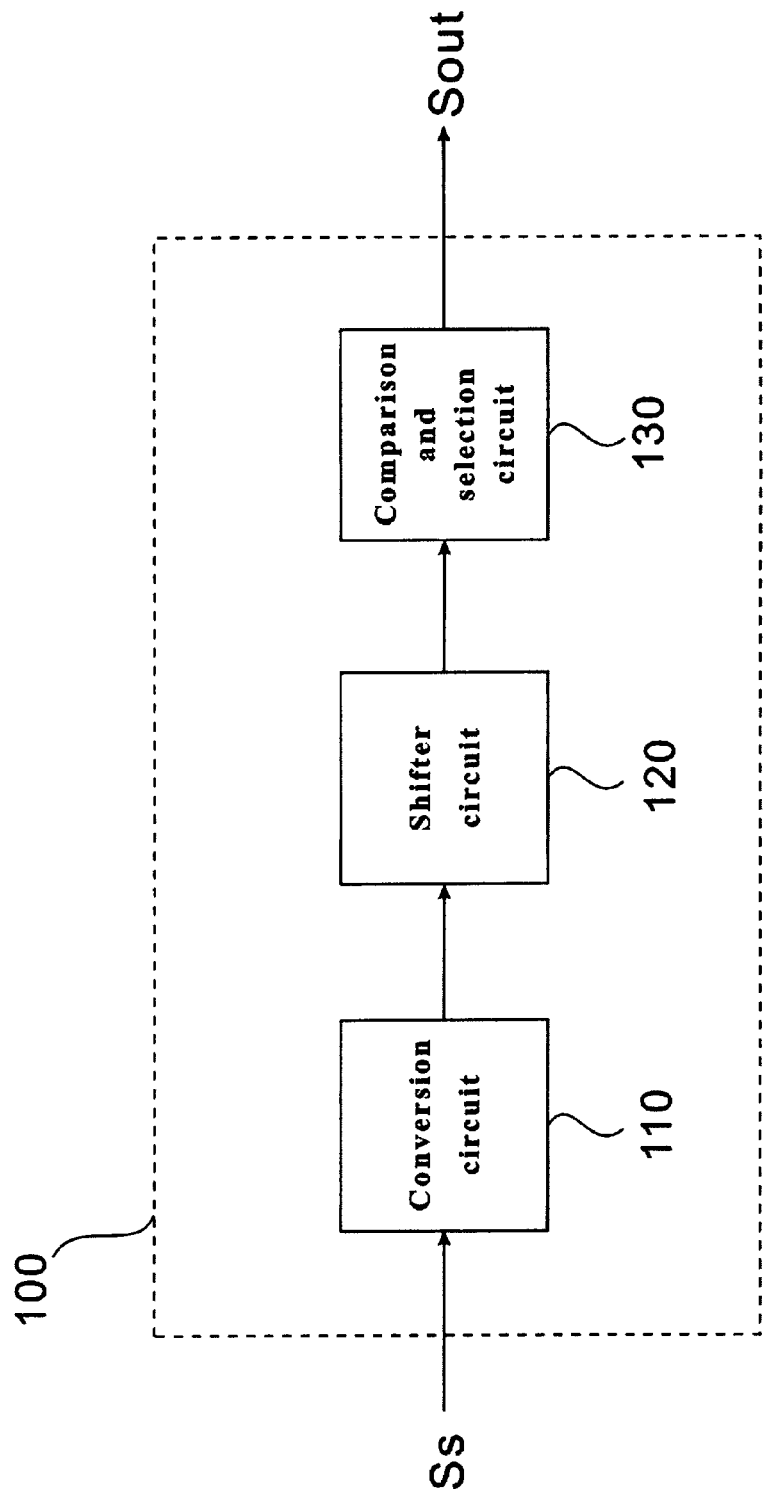
FIG. 1 shows the data switching device of the present invention.

FIG. 1 shows the data switching device of the present invention, data switching device 100 comprising of a conversion circuit 110, a shifter circuit 120 and a comparison and selection circuit 130. The data switching device 100 is mainly used to receive a source data Ss and to perform shift the source data Ss according to the certain shift amount in order to generate an output data Sout that the output data Sout is the data which is shifted by a certain shift amount of the source data Ss. Here, the shift operation of source data Ss can be achieved according to all sizes of coding dimensions defined in the communication specification. We use the real coding dimension to represent the expected coding dimension. Conversion circuit 110 is to receive the source data Ss and to convert it into a data possessing in the tolerable coding dimension with feature of fixed coding dimension, meanwhile, judgment bits are inserted during the conversion process so that what is source data Ss and what is non-source data inserted in the conversion process can be distinguished in the converted data. Shifter circuit 120 performs certain shift amount of shift on the received converted data so that to generate a shifted data, then, the right side and left side of shifted data are used to acquire the real coding dimension to be used respectively as a first data and a second data. Finally, comparison and selection circuit 130 is used to compare the judgment bits in the first data and the second data so as to obtain output data Sout. In the followings, we are going to introduce further the basic architecture of a conversion circuit 110, a shifter circuit 120 and a comparison and selection circuit 130.

Figure 2:
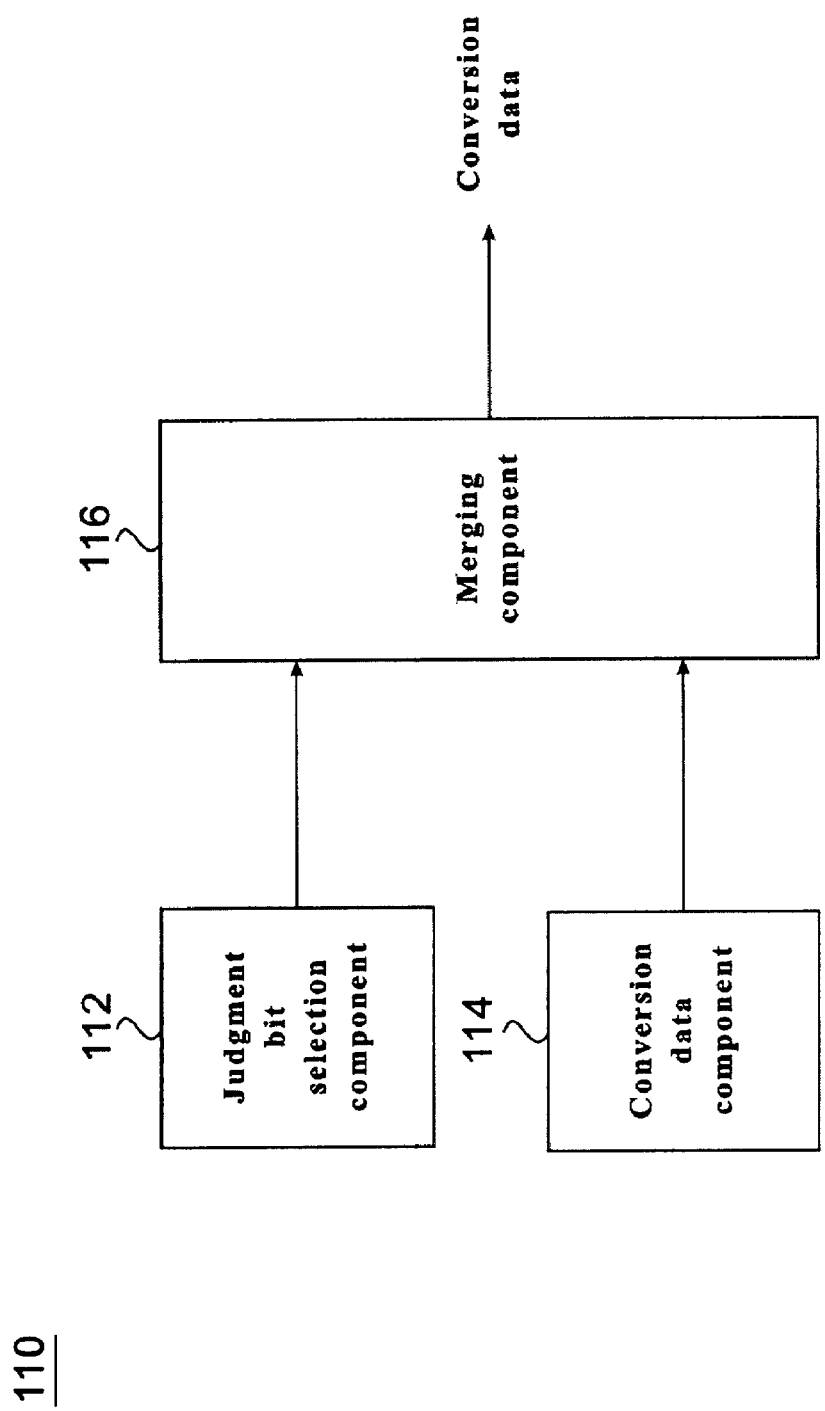
FIG. 2 shows the basic architecture of conversion circuit of the present invention.

FIG. 2 shows the basic architecture of conversion circuit of the present invention. Conversion circuit 110 comprising of a judgment bit selection component 112, a data conversion component 114 and a merging component 116. The function of judgment bit selection component 112 is to provide judgment bits and the function of data conversion component 114 are that let the subsequent output converted data to possess the tolerable coding dimension through the adding of a differential quantity of non-source data which is equal to the difference between the tolerable coding dimension and the real coding dimension; the judgment bits should be designated according to the source data Ss and the non-source data. The functions of judgment bits selection component 112 and data conversion component 114 can be achieved through multiplexer or other circuit of the same function. Finally, the source data Ss and the non-source data are selected using the judgment bits and the data conversion component 114 is merged through merging component 116 and a converted data is then sent out. What needs to be noticed is, the real coding dimension must be not larger than the tolerable coding dimension, in other words, the maximum value of real coding dimension that can be used by source data Ss is the tolerable coding dimension.

Take the communication specification in WiMax as an example, it has 19 sizes of coding dimensions as: 24, 28, 32 . . . 96. Tolerable coding dimension can be set up as the largest value 96 of the 19 sizes of coding dimension and the real coding dimension can then be selected as the 19 sizes of coding dimensions in WiMax. If the real coding dimension is 24, the judgment bit selection component 112 will then provide 24 the correct bits and 72 the error bits; moreover, in addition to source data Ss, data conversion component 114 has to provide 72 sets of non-source data; furthermore, the correct bit has to be added correspondingly on the part of source data Ss through the merging component 116 and the error bit has to be added correspondingly on the part of non-source data through the merging component 116, that is, the converted data is generated. Judgment bits selection component 112 provides in the judgment bits in the input endpoint corresponding to 19 sizes of coding dimension, for example, 24 the correct bits and 72 the error bits, 28 the correct bits and 68 the error bits, etc.; moreover, the judgment bits at the input end point are selected through the real coding dimension. Similarly, the data conversion component 114 provides in the non-source data in the input endpoint corresponded to 19 sizes of coding dimensions, and then non-source data at the input end point is selected through the real coding dimension, then source data of the real coding dimension is added to the output data in the size of the tolerable coding dimension. What needs to be noticed here is, the selection range of real coding dimension should be decided by the tolerable coding dimension; if the tolerable coding dimension is set as 32, then real coding dimension can only be selected as 24, 28 and 32.

Figure 3:
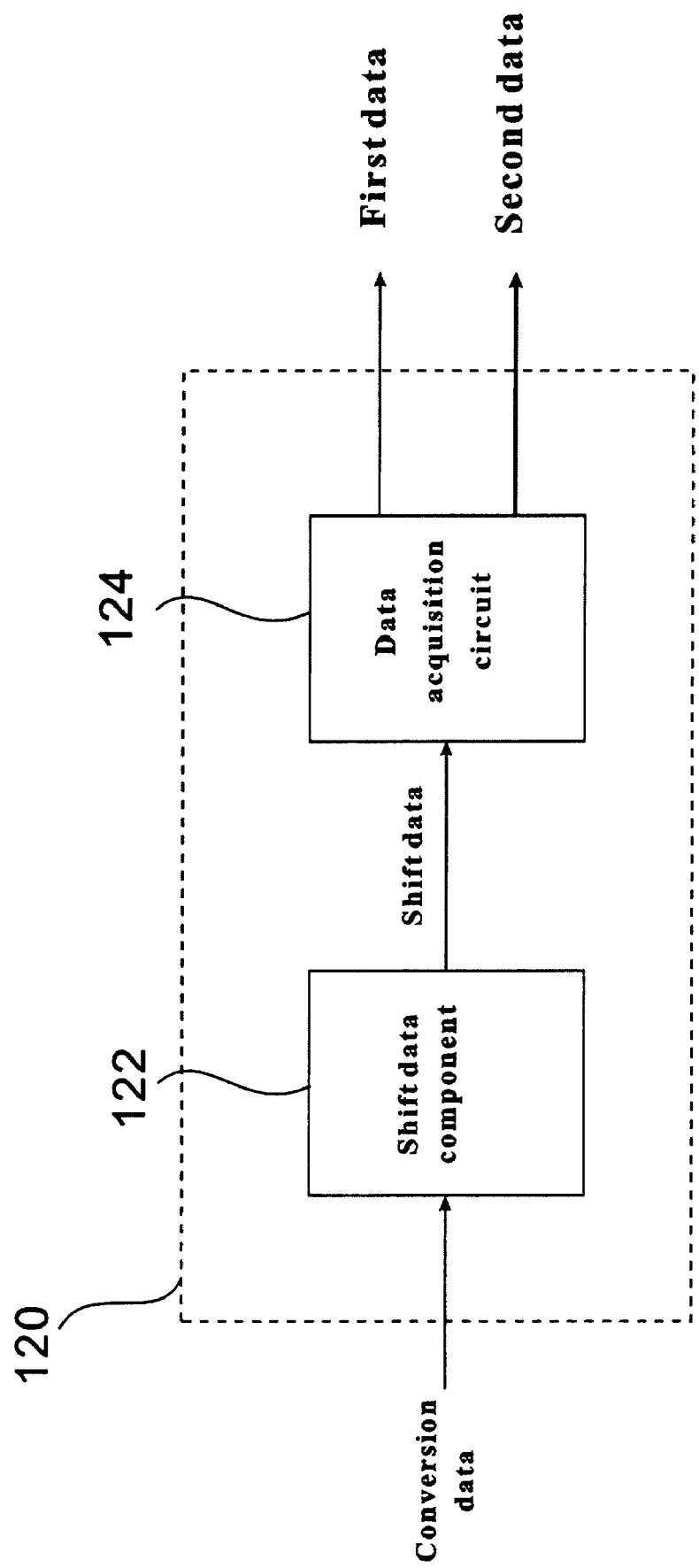
FIG. 3 is the basic architecture of shifter circuit of the present invention.
Figure 3A:
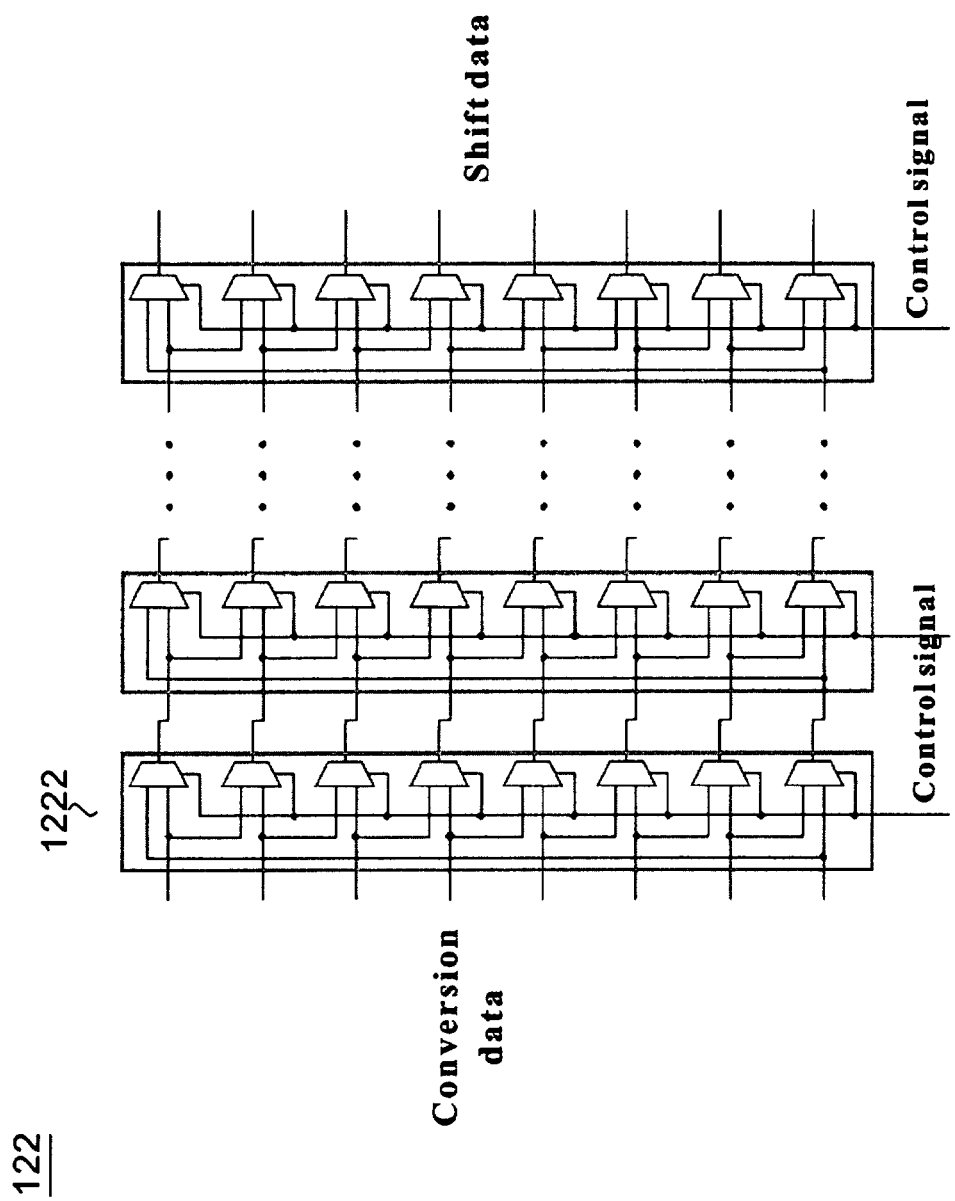
FIG. 3A is the basic architecture of the shifter component of the present invention.

FIG. 3 shows the basic architecture of shifter circuit of the present invention. FIG. 3A shows the basic architecture of the shift data component of the present invention. FIG. 4A~4B are the illustrations of the processing flows of shifter circuit of the present invention. Please refer to FIG. 3 and FIG. 4A~4B at the same time to make the explanation easier. Shifter circuit 120 comprising of a shift data component 122 and a data acquisition circuit 124. After the converted data is received by the shift data component 122, a shift action is performed on the converted data so that the converted data is shifted a certain shift amount to become shifted data as shown in FIG. 4A. Here, the parts of judgment bits are reserved in the converted data and the shifted data and we designate the correct bit as 1 and error bit as 0; however, according to different design, the correct bit can also be designated as 0 and the error bit can be designated as 1. in the process of converted data, we define the right side part of conversion data is LSB1 and the left side part of conversion data is MSB1; for the execution of shift action, it is started from the right side part LSB1 to the right by a shift amount of A to become shifted data. Of course, according to different design, the execution of the shift action can also be changed to a start from right side part LSB1 to the left in certain shift amount.

Please refer to FIG. 3A, which shows that the design of shift data component 122 is to use the first grade circuit 1222 to receive converted data, then circuit in each grade is connected to the data generated in the previous grade so as to convert the converted data into shifted data. Take the first grade circuit 1222 as an example, multiple numbers of multiplexers are used to move the source data and each multiplexer is connected to the data of two neighboring bits of the converted data, and the last multiplexer is connected to the highest bit and the lowest bit of the converted data; then control signal is used to select the output data in each multiplexer, and the principle of each grade of circuit is the same as the first grade circuit 1222; then through the design of each grade of electronic circuit, the shift amount can be controlled, generally speaking, the electronic circuit grade of shift data component 122 is equal to the tolerable coding dimension minus 1. Wherein the number of multiplexer in each grade of electronic circuit should be equal to the tolerable coding dimension, Take FIG. 3A as an example, the tolerable coding dimension is 8, the number of multiplexer of the first grade circuit 1222 thus must be equal to 8 and shift data component 122 then has 7 grades of electronic circuit. What needs to be noticed here is, the design of shift data component 122 it the same as the design of the conventional shift data component; the difference is, the design of shift data component 122 is corresponded to the tolerable coding dimension, there is no need to design circuit that is not corresponded to the tolerable coding dimension; the main reason is, the design of conversion circuit 110 of FIG. 1 makes the coding dimension of the shifted data fixed, therefore, the design of shifted data component 122 only needs to be corresponded to the coding dimension of the shifted data.

Please further refer to FIG. 3 and FIG. 4A~4B. Data acquisition circuit 124 is to acquire part of the shifted data so as to output the first data and the second data as shown in FIG. 4B; the real coding dimension is acquired to start at the right side part of shift data LSB2, this is the so-called the first data, and then real coding dimension is acquired to start at the left side part of the shift data MSB2, this is the so-called the second data.

FIG. 5 shows the basic architecture of comparison and selection circuit of the present invention. Comparison and selection circuit 130 comprising of comparison circuit 132 and selection data merging component 134. Comparison circuit 132 receives the first and the second data and selected output data that is designated as correct bits through a comparison of judgment bits at corresponding locations of the first and the second data. Here, please refer to FIG. 4B, since the first and the second data are data of the real coding dimension length at the same time, comparison circuit 132 is thus judgment bit which compares the same location of the first and the second data; for example, the judgment bits are compared and start from the right side part of the first data LSB3 of the and the right side part of the second data LSB4 of the second data, and the comparison is done one by one until the judgment bits of the left side part of the first data MSB3 and the left side part of the second data MSB4; when the judgment bit of the comparison is designated as correct bit, comparison circuit 132 will select the output data with the correct bits, that is, selection data. What needs to be noticed is, there is no limitation on the starting order of comparison in comparison circuit 132, in addition to start the comparison from the right side part of the first data LSB3 and the right side part of the second data LSB4, the judgment bit comparison can also be started from the left side part of the first data MSB3 and the left side part of the second data MS4.

Selection data merging component 134 is to receive selection data sent out from comparison circuit 132 and merge the data into output data Sout, that is, source data Ss of A the shift amount.

FIG. 6 is the basic architecture of comparison circuit of the present invention. Comparison circuit 132 needs to possess comparator 1320 with a quantity the same as the tolerable coding dimensions, this is as shown in FIG. 6, each comparator 1320 will compare the judgment bits at the corresponding location of the first data and the second data and output selected data which is designated as the correct bit. Wherein, each comparator 1320 operates independently and will not affects the others. Therefore, through the simultaneous action of each comparator 1320, the parallel processing effect can then be reached and the processing time of data switch can then be shortened in data switching device of the present invention can be applied in communication system of high performance and high speed.

What needs to be noticed is, the length of the first and the second data is the same as the length of real coding dimension; during the comparison of the judgment bits and the output of selected data, comparator 1320 only of the quantity of real coding dimension will be used, therefore, only under the situation when the real coding dimension is equal to the tolerable coding dimension, all the comparison circuits 132 will be used.

Please refer again to FIG. 5, the comparison and selection circuit 130 further comprising of an adder 136. When comparator 1320 compares the judgment bits at the corresponding location of the first and the second data, it is not true in each time that only one is the correct bit and another one is the error bit; therefore, adder 136 needs to be used for the adding of shift amount A and the quantity of the real coding dimension in order to generate a reference value to be used as reference standard. When the judgment bits of the first data and the second data in comparator 1320 are all correct bits and if reference value is larger than tolerable coding dimension, output the second data, otherwise, output the first data.

What needs to be noticed is, as shown in FIG. 1, when shifter circuit 120 performs shift action of data conversion, if the shift amount is not too large, it is easier for the comparison and selection circuit 130 to all appear correct bits when the judgment bits of the first and the second data are compared; although as mentioned before, when the reference value is larger than the tolerable coding dimension, the output will be second data and on the contrary, the output will be the first data, yet there are still some corner case conditions that are difficult to judge. That is, when the range of real coding dimension is larger than ⅔ of the tolerable coding dimension but smaller than the tolerable coding dimension and when all the judgment bits of the first data and the second data are all correct bits, that is, as mentioned above, the situation that the comparison of judgment bits of the first and the second data does not fully apply. Take the tolerable coding dimension of 96 as an example, if the real coding dimension is 92 and the shift is 50, the comparison of judgment bits of the first and the second data as mentioned above does not apply here, as shown in FIG. 5, comparator 1320 must output the part of the first data. For those parts that are not applicable to the judgment method as mentioned above, they can be solved by limitation method or the adding of an additional database for judgment. Wherein, the so-called limitation method means when the judgment method as mentioned above is not fully applicable, we must limit the sum of the real coding dimension and the shift amount to be smaller than the tolerable coding dimension. The judgment method of adding additional database means to measure in the advance real coding dimension and shift amount in order to acquire data that is not applicable to the method of comparison of the judgment bits of the first and the second data as mentioned above and place this data in the additionally added database; therefore, when the situation that the judgment method is not fully applicable happens, it can be judged through a comparison of the data added in the database. The additionally added database can be memory device, for example, flash memory, hard disk, non-volatile memory, etc.

FIG. 7 is the data switching method process flow of the present invention, which is used to further explain the operation process flow of data switching device. First, step S200 is to receive source data Ss, and the same as what is mentioned above, source data Ss possesses the length of real coding dimension, then enter step S202 to convert source data Ss into a converted data possesses according to the size of the tolerable coding dimension and judgment bits. Wherein, the real coding dimension is not larger than the tolerable coding dimension. Through the insertion of judgment bits in the converted data, the source data Ss location in the converted data is designated as correct bits, and the non-source data location provided by data conversion component 114 as mentioned above is designated as error bits; therefore, in the subsequent data switch action, we can recover source data Ss according to correct bits.

Later on, step S204 will perform shift to convert the source data into shifted data. The main purpose of this step is to let source data Ss make a shift and to get output data that is source data Ss shifted according to a certain shift amount after the data switching.

In the next step, S206, is to acquire shifted data according to the real coding dimension so as to obtain the first data and the second data, that is, as mentioned above, starting to acquire data of the length of real coding dimension from the right side of the shift data LSB2 and the left side of the shift data MSB2, that is, the first and the second data.

Next, perform step S208 to compare the first and the second data. As mentioned above, the first and the second data are data in sizing of the real coding dimension, therefore, the comparison of the first and the second data as mentioned in step S208 means to perform comparison of judgment bits at the corresponding location of the first and the second data; for example, at the lowest bit location of the first and the second data, both judgment bits are compared in order to output data at a location designated as correct bits, that is, the selection data as mentioned above. Finally, step S210 is perform to generate output data, that is, to merge all the selection data in order to generate output data Sout as mentioned above. Wherein, in the first and the second data, the comparison method of each judgment bit in each corresponding location is the same, the comparison of judgment bits at the lowest bit and the highest bit location is the same and the comparison of judgment bit will be described as follows.

FIG. 8 is the processing flow of a method of comparison of the judgment bits of the first and the second data, that is, the processing flow of comparison of the first and the second data of step S208 as mentioned in FIG. 7. First, S300 is performed to judge the condition which if the judgment bits of the first and the second data are all correct bits, if so, the judgment principle must be executed, that is, step S302 has to be executed to judge the condition which if reference value is larger than tolerable coding dimension.

If so, execute S304 to output the data at the corresponding location of the second data; if no, execute step S306 to output the data at the corresponding location of the first data. For example, please refer to FIG. 4B, When the judgment bits of the left side of the first data MSB3 and the left side of the second data MSB4 are all correct bits and if the reference value is larger than tolerable coding dimension, then the data at the left side of the second data MSB4 must be used as selection data. Similarly, when the reference value is smaller than the tolerable coding dimension, the data at the left side of the first data MSB3 of the first data must be used as selection data.

Then go back to step S300, if the judgment bits of the first data and the second data are judged not to be all correct bits, go to step S308 to judge which one of the judgment bits of the first and the second data is correct bit, if the judgment bit of the first data is correct bit, execute step S306; if the judgment bit of the second data is correct bit, execute step S308. Of course, in step S308, the way of judging the judgment bits of the first and the second data to decide which one is correct bit can be changed to the judgment of the first data to see if it is correct bit or to the judgment of the second data to see if it is correct bit. Through the method of a comparison of judgment bits of the first and the second data as shown in FIG. 8, we can further know that the purpose of insertion judgment bits in the step S202 in FIG. 7 is for comparison.

However, in the first and the second data, when the range of real coding dimension is larger than ⅔ of the tolerable coding dimension and smaller than the tolerable coding dimension and when the judgment bits of the first data and the second data are all correct bits, the method of comparison of judgment bits of the first and the second data as in FIG. 8 is not fully applicable; therefore, other judgment steps and the corresponding treatments are needed to be added so that it will be no mistakes in the method of comparison of judgment bits of the first and the second data as in FIG. 8.

Therefore, between step S202 and step S204 as in FIG. 7, it further comprises of a step of judging the range of real coding dimension to see if the range of real coding dimension is larger than ⅔ of the tolerable coding dimension and smaller than the tolerable coding dimension, if so, the sum of real coding dimension and the shift amount must be limited to be smaller than the tolerable coding dimension, that is, the reference value must be smaller than the tolerable coding dimension; however, since the real coding dimension of source data Ss received in step S200 in FIG. 7 is fixed, the reference value thus must be smaller than the tolerable coding dimension, which is a limitation of shifter; if no, go to step S204. The situation of difficult judgment as in step S208 will thus not happen through the execution of this step. In addition to such method, the other judgment step and the corresponding treatment will be described as in the followings.

Between step S302 and step S204 as in FIG. 8, it further comprises of a step of judging the range of real coding dimension to see if the range of real coding dimension is larger than ⅔ of the tolerable coding dimension and smaller than the tolerable coding dimension; if so, it must be dealt with the adding of additional database for judgment, that is, to compare to see if the real coding dimension and the shift match the data in the additionally added in the database, if so, execute step S306, if not, execute step S308. Wherein, the content of the database is acquired from the non-applicable data that is a result of a comparison of the judgment bits of the first and the second data and through a shifter testing according to all size of real coding dimensions.

We know from the above mentioned descriptions that only through the use of single data switch device of the present invention, data switching action can be performed on the data of all kinds of coding dimensions under the communication specification, briefly speaking, in the present invention, only single shifter circuit design is needed to achieve the effect of conventional data switching device which needs multiple selectronic circuit designs to switch data according each different coding dimension individually. Therefore, the entire circuit design is simple and the layout of chip is very simple;

moreover, the ship area of e circuit is much smaller than that of conventional data switching device.

Although the present invention is disclosed with better embodiment as above, yet it is not used to limit the present invention; anyone who is familiar with this art can do any kinds of changes and modifications without deviating the spirit and scope of the present invention; therefore, the protection scope of the present invention should be based on what is claimed as follows.

What is claimed is:

1. An apparatus for switching data in communication system, comprising:
   a conversion circuit used to receive a source data possessing a real coding dimension and convert the source data into a converted data of a tolerable coding dimension, wherein the converted data possesses judgment bits, and correct bits are designated at the judgment bits of the source data and error bits are designated at the judgment bits of the source data with the real coding dimension not larger than the tolerable coding dimension;
   a shifter circuit to shift the converted data in a certain shift amount so as to generate a shifted data, then acquisition of the real coding dimension is completed starting from the least significant bit (LSB) of the shifted data to be used as a first data, and acquisition of the real coding dimension is done starting from the most significant bit (MSB) of the shifted data to be used as a second data; and
   a comparison and selection circuit comparing the judgment bits of the first data and the second data and selecting to output an output data as the data that the source data is shifted in a certain amount.

2. The apparatus for switching data in communication system of claim 1, wherein the conversion circuit comprises:
   a judgment bit selection component used to provide the judgment bits and is the correct bits are designated on the judgment bits of the source data and the error bits are designated on the judgement bits of a non-source data;
   a data conversion component used to provide the source data of the real coding dimension and the non-source data which is equal to the tolerable coding dimension minus the real coding dimension; and
   a merging component used to merge the judgement bits, the source data and the non-source data.

3. The apparatus for switching data in communication system of claim 2, wherein the judgment bit selection component is a multiplexer.

4. The apparatus for switching data in communication system of claim 2, wherein the data conversion component is a multiplexer.

5. The apparatus for switching data in communication system of claim 1, wherein the shifter circuit comprises:
   a shift data component used to shift the converted data in a shift amount so that to generate the shifted data; and
   a data acquisition circuit used to acquire the first data and the second data from the shifted data.

6. The apparatus for switching data in communication system of claim 1, wherein the comparison and selection circuit comprises:
   a comparison circuit used to receive the first data and the second data, through a comparison of the judgment bits of the first data and the second data, in order to selectively output selected data that are designated as the correct bits; and
   a selected data merging component used to merge the selected data sent out from the comparator in order to output the output data.

7. The apparatus for switching data in communication system of claim 6, wherein the comparison circuit comprises comparators of a quantity of the tolerable coding dimension, in order to, starting from the most significant bit of the first data and the most significant bit of the second data, receive respectively the first data and the second data; then each of the comparator, compares the judgment bits received from the first data and the second data and selectively outputs the selected data that are designated as the correct bits.

8. The apparatus for switching data in communication system of claim 6, wherein the comparison circuit comprises comparators with a quantity of the tolerable coding dimension so as to receive, starting from the least significant bit of the first data and the least significant bit of the second data, receive respectively the first data and the second data; then each of the comparators compares the judgment bits received from the first data and the second data and outputs the selected data that are designated as the correct bits.

9. The apparatus for switching data in communication system of claim 6, wherein the comparison and selection circuit further comprises an adder to add the shift amount and the real coding dimension into a reference value, and wherein when the comparator judges that the judgment bits of the first data and the second data are the correct bits and when the reference value is larger than the tolerable coding dimension, the comparator outputs the second data; otherwise, the comparator outputs the first data.

10. The apparatus for switching data in communication system of claim 1, wherein the shift amount is a default value.

11. The apparatus for switching data in communication system of claim 9, wherein when a range of the real coding dimension is larger than ⅔ of the tolerable coding dimension and smaller than the tolerable coding dimension and when the judgment bits of the first data and the second data are all the correct bits, the reference value is smaller than the coding dimension.

12. The apparatus for switching data in communication system of claim 9, wherein the data switch device further comprises a database, and when a range of the real coding dimension is larger than ⅔ of the tolerable coding dimension and smaller than the tolerable coding dimension and when both the judgment bits of the first data and the second data are all the correct bits, through comparison of the real coding dimension, the shift amount and the data in the database, an output in the comparison and selection circuit is then decided.

13. The apparatus for switching data in communication system of claim 12, wherein the database is a memory device.

14. A method for switching data in communication system, comprising:
   receiving a source data possessing in a real coding dimension;
   converting the source data to generate a converted data possessing in a tolerable coding dimension wherein the real coding dimension is not larger than the tolerable coding dimension; meanwhile, through installation of judgment bits, bits at the source data location are designated as correct bits and bits at a non-source data location bits are designated as error bits;
   shifting the converted data by a certain shift amount in order to generate a shifted data;
   acquiring respectively the real coding dimensions through the least significant bit (LSB) and the most significant bit (MSB) of the shifted data to be used as the first data and the second data;
   comparing the judgment bits at corresponding locations of the first data and the second data so as to output a selection data at locations designated as the correct bit; and merging each selection data so as to generate an output data.

15. The method for switching data in communication system of claim 14, wherein the shift amount is a default value.

16. The method for switching data in communication system of claim 14, wherein the step of comparing judgment bits at corresponding locations of the first data and the second data comprises:
judging if the reference value for sum of the shift amount and the real coding dimension is larger than the tolerable coding dimension when the judgment bits at the corresponding locations of the first data and the second data are all the correct bits; and
outputting the selected data at the corresponding location of the second data when the reference value is larger than the tolerable coding dimension; otherwise, outputting the selected data at the corresponding location of the first data.

17. The method for switching data in communication system of claim 14, wherein the step of comparing the judgment bits at corresponding locations of the first data and the second data comprises:
outputting the selected data at the corresponding location of the first data when the judgment bits of the first data and the second data are not all the correct bits and when the judgment bit of the first data is the correct bit; and
if the judgment bit of the second data is of the correct bit, then outputting the selected data at the corresponding location of the second data.

18. The method for switching data in communication system of claim 14, wherein the step after converting the source data further comprises judging a range of the real coding dimension so as to limit the reference value to be smaller than the tolerable coding dimension when the range of the real coding dimension is larger than $2/3$ of the tolerable coding dimension and smaller than the tolerable coding dimension.

19. The method for switching data in communication system of claim 16, wherein when the reference value is larger than the tolerable coding dimension, the method further comprises:
judging a range of the real coding dimension so that when the real coding dimension is larger than $2/3$ of the tolerable coding dimension and smaller than the tolerable coding dimension, comparing the real coding dimension and the shift amount as well as the data in the added database;
if the real coding dimension and the shift amount are the same as the data added in the database, sending out the selected data at the corresponding location of the first data; otherwise, sending out the selected data at the corresponding location of the second data.

* * * * *